United States Patent
Mantri et al.

(10) Patent No.: US 12,511,412 B2
(45) Date of Patent: *Dec. 30, 2025

(54) SYSTEMS AND METHODS FOR IMAGE PREPROCESSING AND SEGMENTATION FOR VISUAL DATA PRIVACY

(71) Applicant: Verizon Patent and Licensing Inc., Basking Ridge, NJ (US)

(72) Inventors: Viraj Chandrakant Mantri, Hyderabad (IN); Pooja Chiluvuri, Andhra Pradesh (IN); Srividhya Parthasarathy, Chennai (IN); Pranusha Naandi, Telangana (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/612,164

(22) Filed: Mar. 21, 2024

(65) Prior Publication Data
US 2024/0232403 A1    Jul. 11, 2024

Related U.S. Application Data

(63) Continuation of application No. 17/405,443, filed on Aug. 18, 2021, now Pat. No. 11,966,486.

(51) Int. Cl.
*G06F 21/62* (2013.01)
*G06F 18/23* (2023.01)
(Continued)

(52) U.S. Cl.
CPC .......... *G06F 21/6209* (2013.01); *G06F 18/23* (2023.01); *G06F 21/31* (2013.01);
(Continued)

(58) Field of Classification Search
CPC .. G06F 21/6209; G06F 21/6245; G06F 21/31; G06F 21/84; G06F 18/23; G06T 5/75; G06T 7/11; G06T 7/90; G06V 10/26
See application file for complete search history.

(56) References Cited

U.S. PATENT DOCUMENTS

2005/0286766 A1    12/2005  Ferman
2008/0002911 A1*    1/2008  Eisen ................... H04N 1/4486
                                                      382/283
(Continued)

FOREIGN PATENT DOCUMENTS

JP         3902919       4/2007
WO       2012/088477     6/2012
(Continued)

*Primary Examiner* — Matthew T Henning

(57) ABSTRACT

A device may receive an image and may process the image, with a first model or a second model, to convert the image into a binary image. The device may generate an identifier that identifies the first model, or identifies the second model and a color removed from the image, and may utilize clustering to cluster pixels of the binary image and to generate a segmented image with a quantity of segments. The device may generate a particular number of segments to select, and may select the particular number of segments, as selected segments, from the quantity of segments. The device may mask the selected segments to generate a protected image with masked segments, and may associate the protected image with the identifier and with original pixel data of the masked segments. The device may store the protected image, the identifier, and the original pixel data in a data structure.

20 Claims, 10 Drawing Sheets

(51) Int. Cl.
  *G06F 21/31* (2013.01)
  *G06F 21/84* (2013.01)
  *G06T 5/75* (2024.01)
  *G06T 7/11* (2017.01)
  *G06T 7/90* (2017.01)
(52) U.S. Cl.
  CPC ............... *G06F 21/84* (2013.01); *G06T 5/75* (2024.01); *G06T 7/11* (2017.01); *G06T 7/90* (2017.01)

(56) References Cited

U.S. PATENT DOCUMENTS

| | | |
|---|---|---|
| 2010/0295783 A1 | 11/2010 | El Dokor et al. |
| 2020/0167910 A1 | 5/2020 | Takeuchi et al. |
| 2020/0184098 A1 | 6/2020 | Andrasick et al. |
| 2021/0358123 A1 | 11/2021 | Kearney et al. |
| 2021/0365736 A1 | 11/2021 | Kearney et al. |

FOREIGN PATENT DOCUMENTS

| | | |
|---|---|---|
| WO | 2013/126780 | 8/2013 |
| WO | 2015/196122 | 12/2015 |

\* cited by examiner

SYSTEMS AND METHODS FOR IMAGE PREPROCESSING AND SEGMENTATION FOR VISUAL DATA PRIVACY

RELATED APPLICATION

This application is a continuation of U.S. patent application Ser. No. 17/405,443, entitled "SYSTEMS AND METHODS FOR IMAGE PREPROCESSING AND SEGMENTATION FOR VISUAL DATA PRIVACY," filed Aug. 18, 2021, and which is incorporated herein by reference in its entirety.

BACKGROUND

Image segmentation is the division of an image into regions or categories, which correspond to different objects or parts of objects depicted in the image. Every pixel in the image is allocated to one of a number of these regions or categories.

DETAILED DESCRIPTION OF EXAMPLE EMBODIMENTS

Figure 1A:
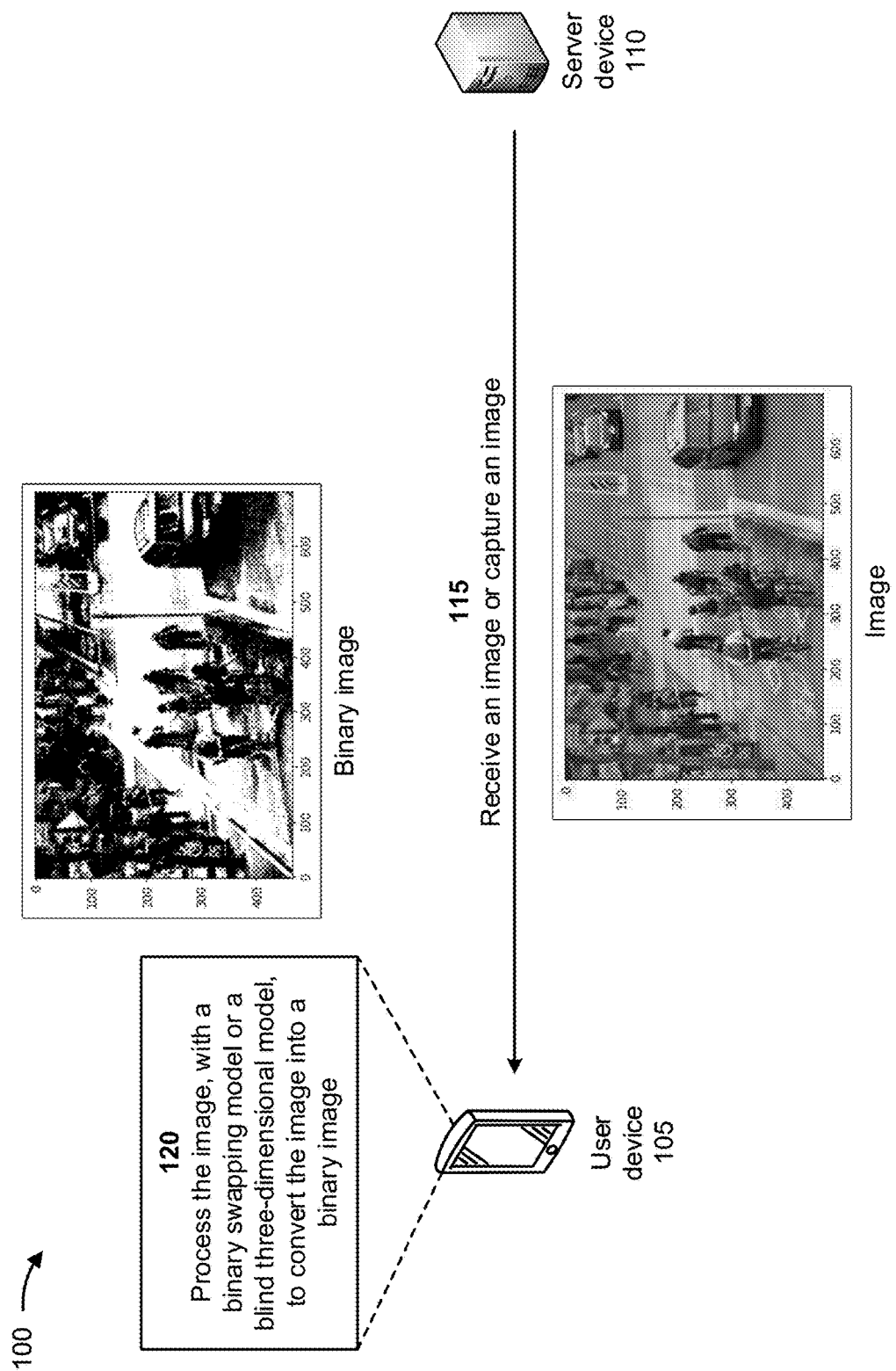
FIGS. 1A-1G are diagrams of an example associated with image preprocessing and segmentation for visual data privacy.

The following detailed description of example implementations refers to the accompanying drawings. The same reference numbers in different drawings may identify the same or similar elements.

Image segmentation includes analyzing an image and image information (e.g., binaries), pixel-by-pixel, to classify different properties (e.g., colors, shapes, designs, and/or the like) as features within the image. The image segmentation process may utilize bounding boxes to classify different properties on objects presented in the image. Image segmentation may provide an understanding of the image and the objects in the image at a granular level. Image segmentation includes semantic segmentation and instance segmentation. Semantic segmentation involves classifying objects with the same pixel values as one, and segmenting the classified objects with the same color-map. Instance segmentation utilizes different color maps for different instances of an object in an image. However, current image segmentation techniques fail to protect private information included in an image from being misappropriated.

Some implementations described herein provide a user device that provides image preprocessing and segmentation for visual data privacy. For example, a user device may receive an image and may process the image, with a first model or a second model, to convert the image into a binary image. The user device may generate an identifier that identifies the first model or the second model, and may cluster pixels of the binary image and to generate a segmented image with a quantity of segments. The user device may generate a particular number of segments to select that is less than the quantity of segments and may randomly select the particular number of segments, as selected segments, from the quantity of segments. The user device may mask the selected segments in the segmented image to generate a protected image with masked segments, and may associate the protected image with the identifier and with original pixel data of the masked segments. The user device may store the protected image, the identifier, and the original pixel data of the masked segments in a data structure.

In this way, the user device provides image preprocessing and segmentation for visual data privacy. For example, the user device may utilize image preprocessing models to perform image segmentation that protects visual content, such as image data, video data, and/or the like stored on the user device. The user device may utilize the image preprocessing models to perform instance segmentation of an image to identify various features (e.g., color, shapes, designs, and/or the like) of the image and to mask the various features for data privacy. The user device may store the unmasked various features in a data structure that is protected with read/write access. This may ensure that the privacy of the image is maintained on the user device.

FIGS. 1A-1G are diagrams of an example 100 associated with image preprocessing and segmentation for visual data privacy. As shown in FIGS. 1A-1G, example 100 includes a user device 105 and a server device 110. Further details of the user device 105 and the server device 110 are provided elsewhere herein. In some implementations, one or more of the functions described herein as being performed by the user device 105 may be performed by the server device 110. Although implementations are described herein in connection with images, the implementations may be utilized with other content, such as videos, video frames, and/or the like.

As shown in FIG. 1A, and by reference number 115, the user device 105 may receive an image from the server device 110 or may capture the image with the user device 105. For example, the user device 105 may provide, to the server device 110, a request for the image, and the server device 110 may provide the image to the user device 105 based on the request. Alternatively, a user of the user device 105 may utilize a camera of the user device 105 to capture the image with the user device 105. In some implementations, the user device 105 stores the image in a data structure associated with the user device 105. The user device 105 may interact with a file system of the user device 105 to retrieve the image stored in the data structure of the user device 105. The data structure may include a secure data structure that utilizes a technique to protect information stored in the data structure. For example, the data structure may utilize keychain encryption or any other known encryption techniques to protect the information stored in the data structure. Keychain encryption may encrypt information using two different keys: a table key (e.g., a metadata key) and a per-row key (e.g., a secret key). Keychain metadata may be encrypted with the table key to speed up searches and a secret value may be encrypted with the per-row key.

As further shown in FIG. 1A, and by reference number 120, the user device 105 may process the image, with a binary swapping model or a blind three-dimensional model, to convert the image into a binary image. In some implementations, the user device 105 may utilize other models to convert the image into the binary image, such as a thresholding model. In some implementations, when processing the image, with the binary swapping model or the blind three-dimensional model, to convert the image into the binary image, the user device 105 may select one of the binary swapping model or the blind three-dimensional model based on the image being processed. The user device 105 may process the image, with the binary swapping model, to convert the image into the binary image if the user device 105 selects the binary swapping model. Alternatively, the user device 105 may process the image, with the blind three-dimensional model, to convert the image into the binary image if the user device 105 selects the blind three-dimensional model.

When processing the image, to convert the image into the binary image, the user device 105 may convert the image into a three-dimensional pixel array (e.g., a red, green, blue (RGB) array format). The user device 105 may convert the three-dimensional pixel array into a two-dimensional pixel array (e.g., a grayscale image) with an intensity denoted by intensities of black or white pixels. The user device 105 may convert the two-dimensional pixel array (e.g., the grayscale image) into a binary image (e.g., a black and white image). An intensity of the binary image may be inverted relative to the intensity of the two-dimensional pixel array. The intensity of the binary image may be inverted by subtracting an original binary pixel value from one to arrive at a new binary pixel value (e.g., which will convert black pixels to white pixels and white pixels to black pixels). A binary swapping model may convert less dominant-colored areas (or light-colored areas) into black, which can be segmented and masked to protect privacy of the image.

When processing the image, with the blind three-dimensional model for example, to convert the image into the binary image, the user device 105 may convert the image into a three-dimensional pixel array (e.g., a red, green, blue (RGB) array format). The user device 105 may randomly select a dimension (e.g., red, green, or blue) to remove and may remove the dimension from the three-dimensional pixel array to generate a two-dimensional pixel array (e.g., convert the three-dimensional pixel array into the two-dimensional pixel array, such as a two-color image). In one example, when converting the RGB image into the two-color image, if red (R) is the selected dimension to remove, then the value of R=0 and the two-color image may be calculated based on $[0 \times R+0.5870 \times G+0.1140 \times B]=0.5870 \times G+0.1140 \times B$, where G represents a green value, B represents a blue value, and 0.5870 and 0.1140 are constants of the model. In another example, if G is the selected dimension to remove, then the value of G=0 and the two-color image may be calculated based on $[0.2989 \times R+0 \times G+0.1140 \times B]=0.2989 \times R+0.1140 \times B$, where 0.2989 and 0.1140 are constants of the model. In still another example, if B is the selected dimension to remove, then the value of B=0 and the two-color image may be calculated based on $[0.2989 \times R+0.5870 \times G+0 \times B]=0.2989 \times R+0.5870 \times G$, where 0.2989 and 0.5870 are constants of the model. The user device 105 may convert the two-dimensional pixel array (e.g., the two-color image) into the binary image (e.g., a black and white image). The blind three-dimensional model may protect the privacy of details in the image for segmenting the image.

Figure 1B:
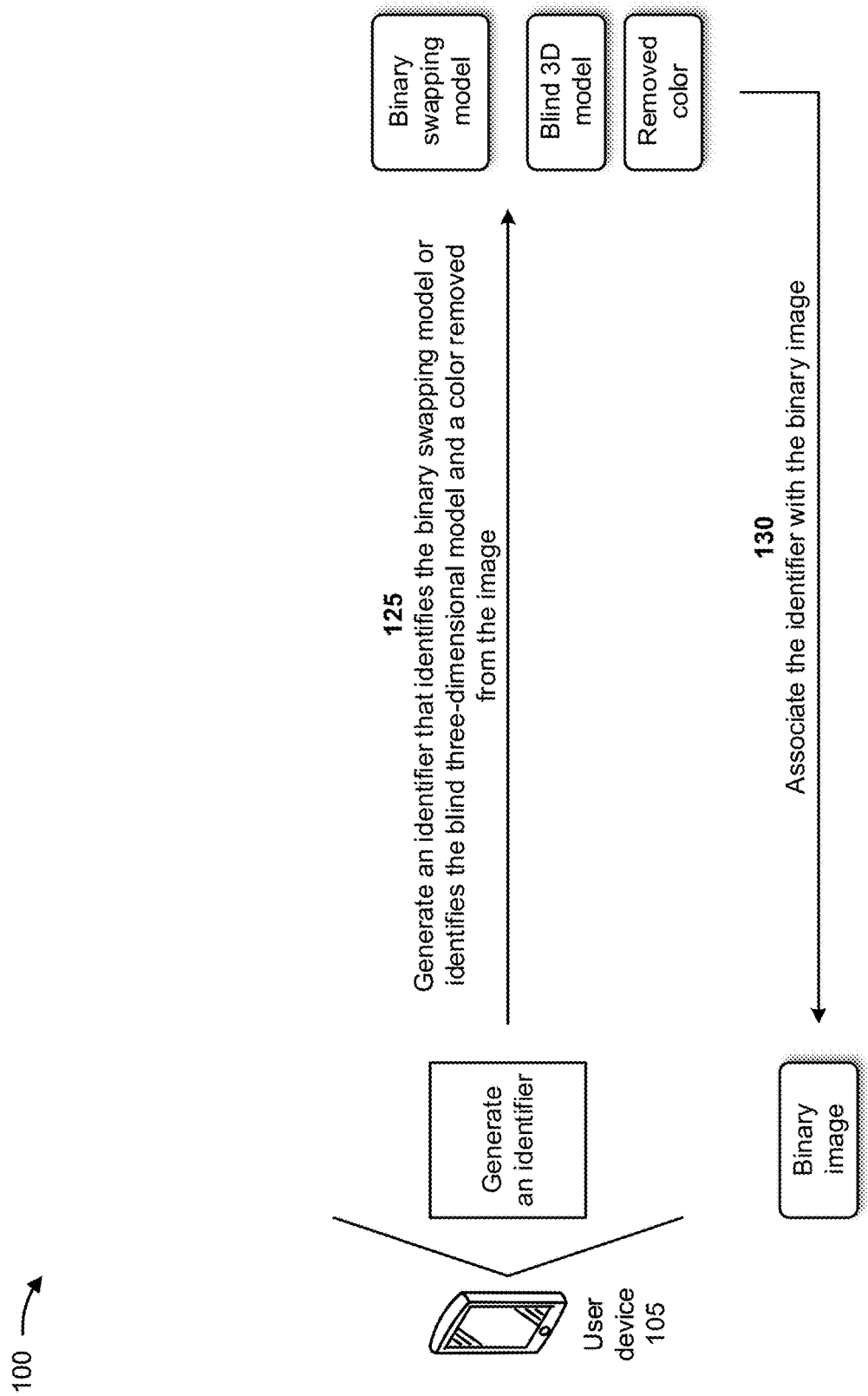

As shown in FIG. 1B, and by reference number 125, the user device 105 may generate an identifier that identifies the binary swapping model, or identifies the blind three-dimensional model and a color (e.g., a dimension) removed from the image. In some implementations, the identifier may identify other models, such as thresholding model. For example, the user device 105 may generate an identifier that identifies the binary swapping model when the user device 105 utilizes the binary swapping model for processing the image. Alternatively, the user device 105 may generate an identifier that identifies the blind three-dimensional model and the color removed from the image when the user device 105 utilizes the blind three-dimensional model for processing the image.

As further shown in FIG. 1B, and by reference number 130, the user device 105 may associate the identifier with the binary image. For example, the user device 105 may associate the identifier with the binary image and may store the binary image and the identifier in the data structure along with the image.

Figure 1C:
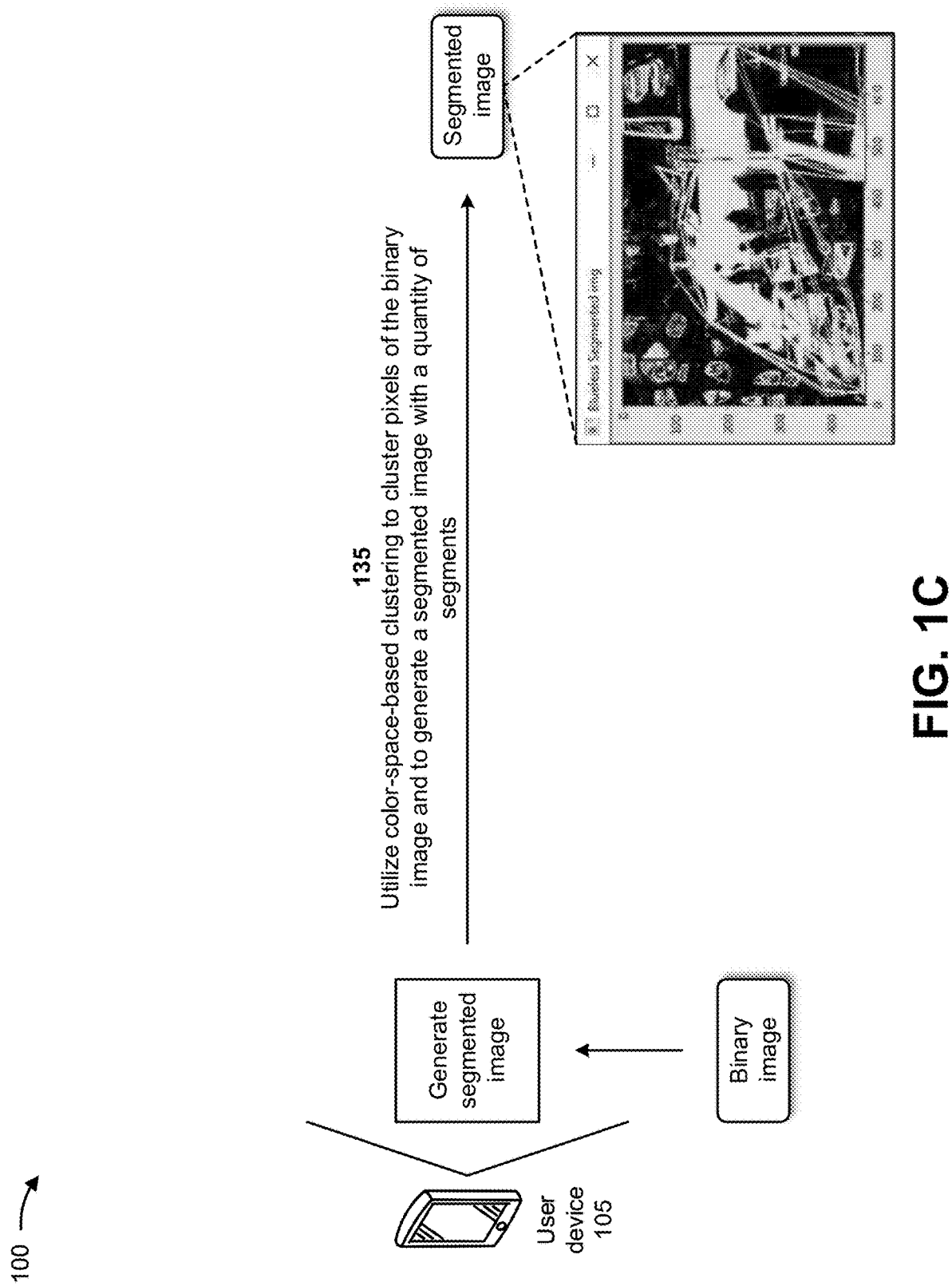

As shown in FIG. 1C, and by reference number 135, the user device 105 may utilize color-space-based clustering to cluster pixels of the binary image and to generate a segmented image with a quantity of segments. The color-space-based clustering may be performed by a k-means clustering model or any other clustering model that separates colors in an image. The k-means clustering model for example, may identify a number (k) of centroids and may allocate every data point to a nearest cluster (e.g., segment), while keeping the centroids as small as possible. The k-means clustering model may segment the image by grouping pixels based on a domain space (e.g., the color space). The user device 105 may process the binary image, with the k-means clustering model, to cluster the pixels of the binary image and to generate the segmented image with the quantity of segments. In some implementations, the color-space-based clustering may be performed by a recursive region splitting model that computes histograms for each component of interest (e.g., red, green, and blue) of the image, selects a threshold to split the image into two regions, and repeats the aforementioned steps until no new regions can be created.

Figure 1D:
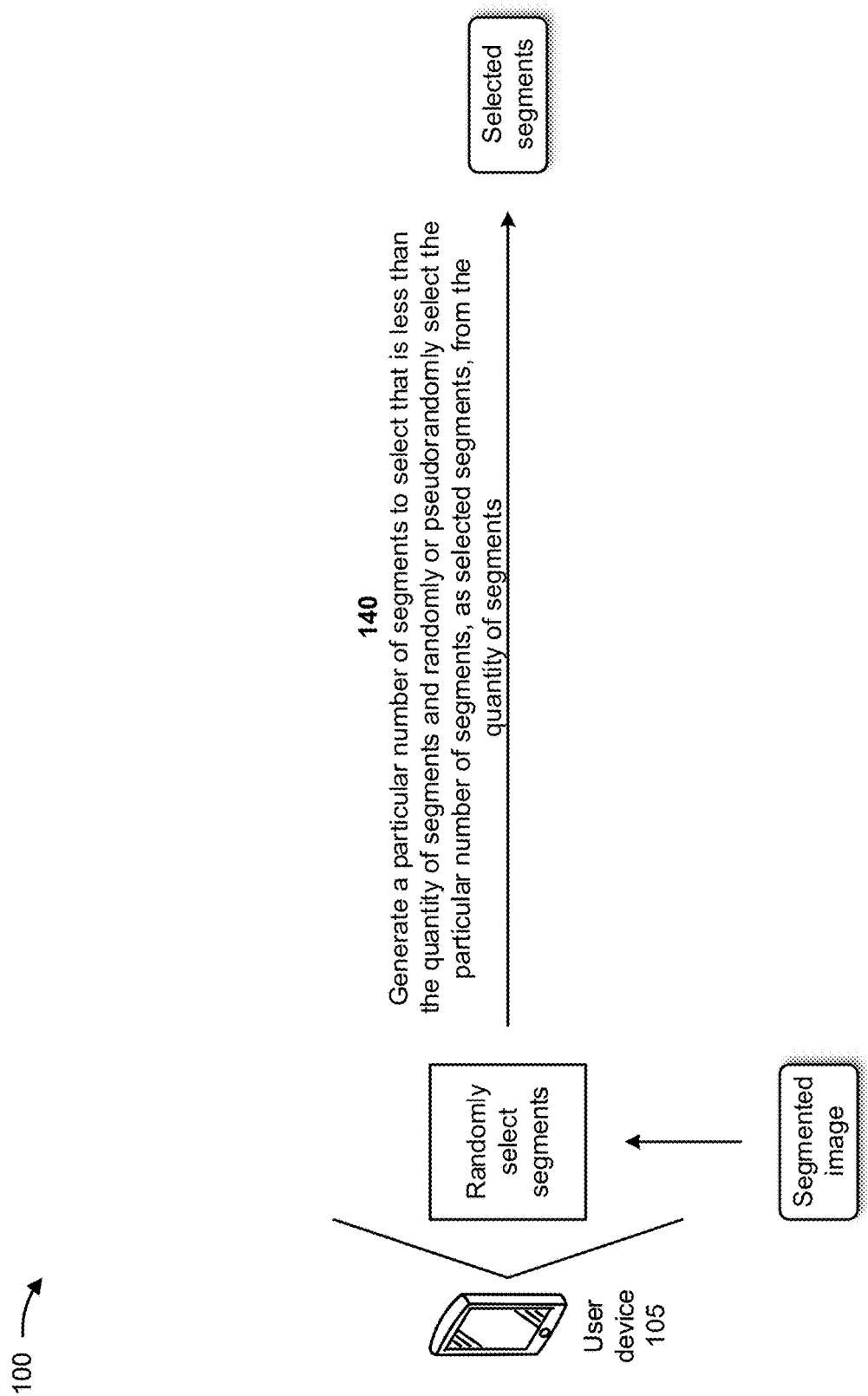

As shown in FIG. 1D, and by reference number 140, the user device 105 may generate a particular number of segments to select that is less than the quantity of segments and may randomly or pseudorandomly select the particular number of segments, as selected segments, from the quantity of segments. For example, the user device 105 may generate a particular number that is greater than zero and less than the quantity of segments in the segmented image (e.g., a total number of segments in the segmented image). If the k-means clustering model is utilized, the quantity of segments of the segmented image may be represented by the number (k) of centroids (e.g., clusters) identified by the k-means clustering model. The user device 105 may randomly or pseudo-randomly select the particular number of segments, as selected segments, from the quantity of segments. The user device 105 may store original pixel data of the selected segments in the data structure associated with the user device 105.

Figure 1E:
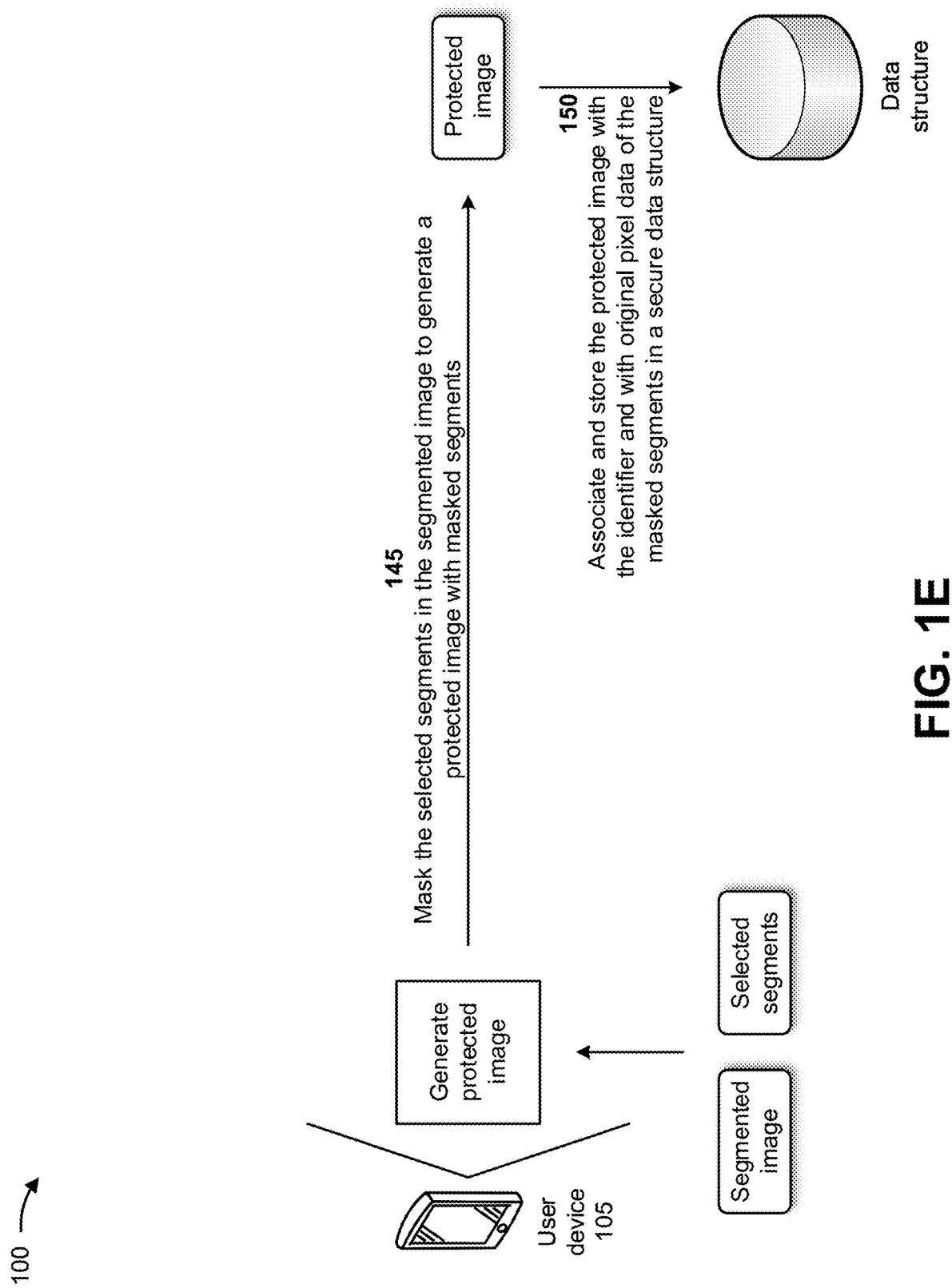

As shown in FIG. 1E, and by reference number 145, the user device 105 may mask the selected segments in the segmented image to generate a protected image. For example, the user device 105 may mask the selected segments of the segmented image and may leave the unselected segments of the segmented image unmasked. The image with masked selected segments and the unmasked unselected segments may generate the protected image.

As further shown in FIG. 1E, and by reference number 150, the user device 105 may associate and store the protected image with the identifier and with original pixel data of the masked segments in a secure data structure. For example, the user device 105 may associate the protected image with the identifier and the original pixel data of the masked segments. The user device 105 may store the protected image, the identifier, and the original pixel data of the masked segments in the data structure (e.g., secured via keychain encryption) associated with the user device 105.

Once the protected image is stored in the data structure, a user of the user device 105 may provide, to the user device 105, an input that causes the user device 105 to display thumbnails of images stored in the data structure of the user device 105. A thumbnail of the image, processed to generate the protected image, may be included in the displayed thumbnails of images.

Figure 1F:
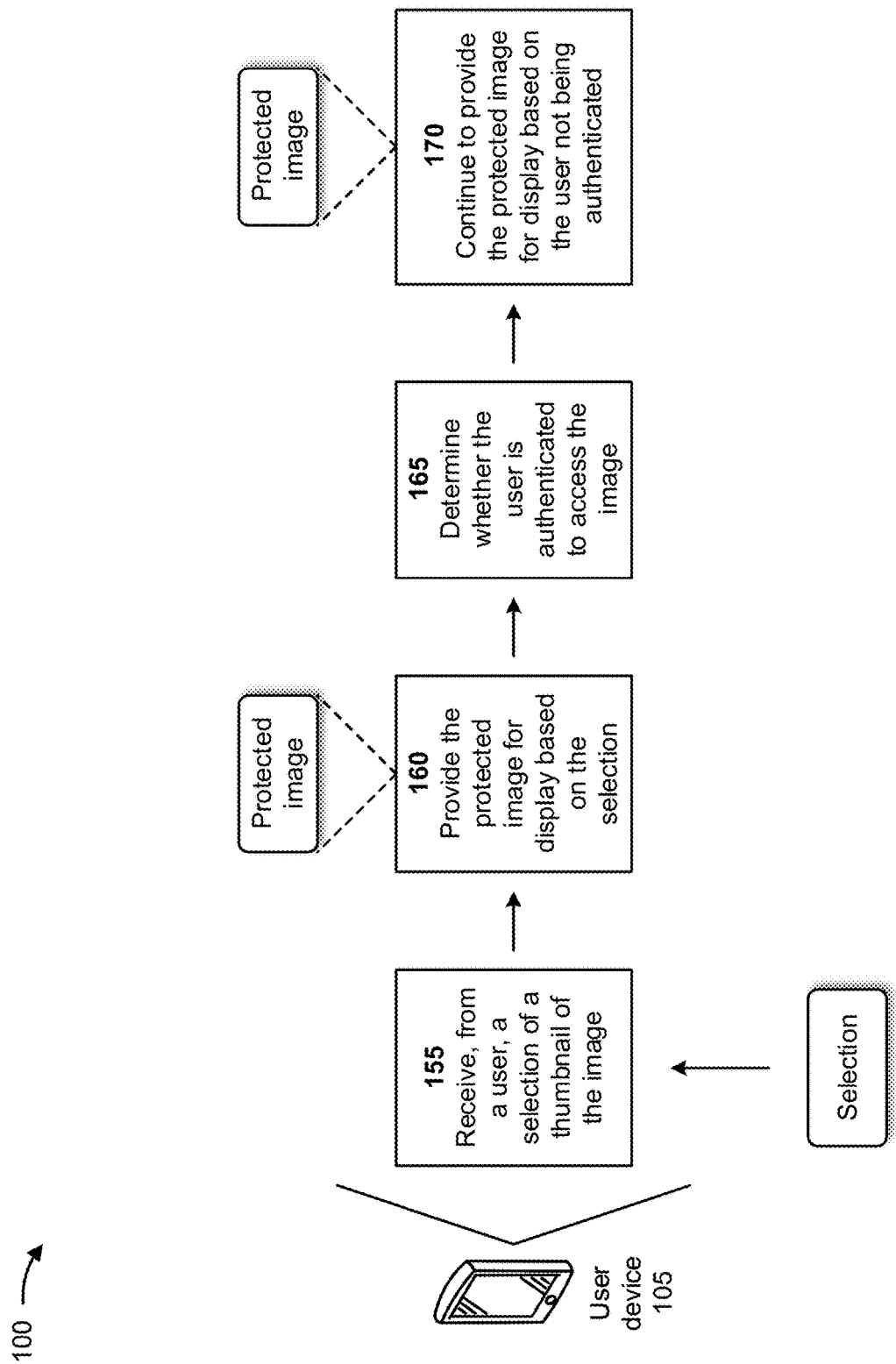

As shown in FIG. 1F, and by reference number 155, the user device 105 may receive, from a user, a selection of a thumbnail of the image. For example, the user of the user device 105 may select the thumbnail of the image from the displayed thumbnails of images by selecting the thumbnail of the image via a touchscreen input, via mouse selection, via an audible command, and/or the like.

As further shown in FIG. 1F, and by reference number 160, the user device 105 may provide the protected image for display based on the selection. For example, the user device 105 may identify the association between the image (e.g., the thumbnail of the image) and the protected image generated for the image. The user device 105 may locate the protected image in the data structure based on the association and may provide the protected image for display to the user, instead of displaying the image. This may protect the privacy of the image until the user is properly authenticated.

As further shown in FIG. 1F, and by reference number 165, the user device 105 may determine whether the user is authenticated to access the image. For example, the user device 105 may request credentials (e.g., a username, a password, a personal identification number, a biometric input, and/or the like) from the user and the user may provide credentials to the user device 105 (e.g., via a textual input, a biometric input, an audible input, and/or the like). The user device 105 may determine whether the user is authenticated based on the credentials received from the user.

As further shown in FIG. 1F, and by reference number 170, the user device 105 may continue to provide the protected image for display based on the user not being authenticated. For example, if the user device 105 determines that the user is not authenticated based on the credentials received from the user (or based on not receiving credentials from the user), the user device 105 may continue to provide the protected image for display to the user. This may prevent an unauthenticated user from accessing the image and may protect the privacy of the image.

Figure 1G:
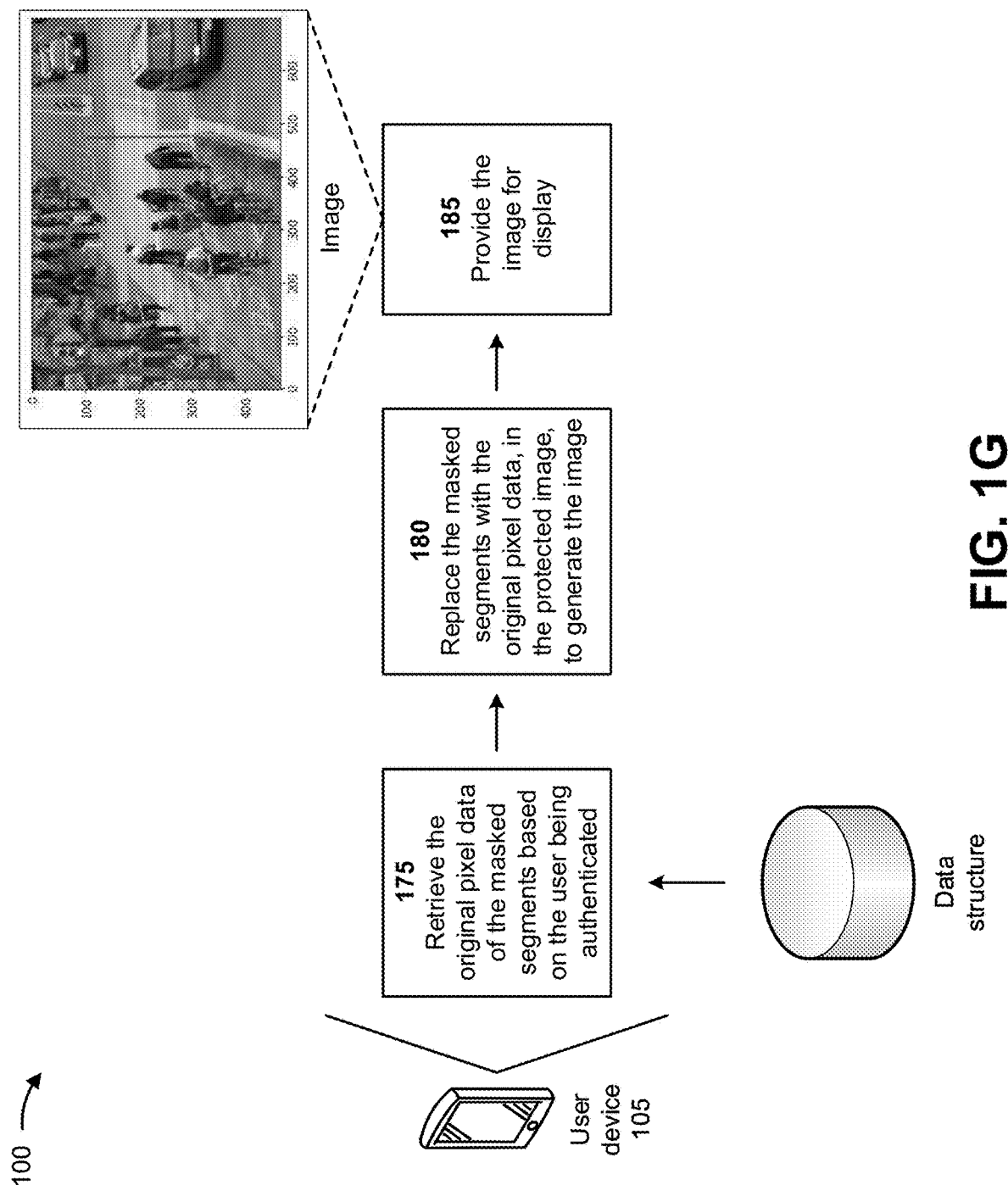

As shown in FIG. 1G, and by reference number 175, the user device 105 may retrieve the original pixel data of the masked segments based on the user being authenticated. For example, if the user device 105 determines that the user is authenticated based on the credentials received from the user, the user device 105 may retrieve the original pixel data of the masked segments from the data structure associated with the user device 105. In some implementations, the user device 105 may decrypt the original pixel data of the masked segments if such data is stored in encrypted format in the data structure.

As further shown in FIG. 1G, and by reference number 180, the user device 105 may replace the masked segments with the original pixel data, in the protected image, to generate the image. For example, if the user device 105 determines that the user is authenticated based on the credentials received from the user, the user device 105 may replace the masked segments with the original pixel data, in the protected image, to generate the image (e.g., a complete three-dimensional pixel array of the original image).

As further shown in FIG. 1G, and by reference number 185, the user device 105 may provide the image for display.

For example, if the user device 105 determines that the user is authenticated based on the credentials received from the user, the user device 105 may provide the image for display.

In this way, the user device 105 provides image preprocessing and segmentation for visual data privacy. For example, the user device 105 may utilize image preprocessing models to perform image segmentation that protects visual content, such as image data, video data, and/or the like stored on the user device 105. The user device 105 may utilize the image preprocessing models to perform instance segmentation of an image to identify various features (e.g., color, shapes, designs, and/or the like) of the image and to mask the various features for data privacy. The user device 105 may store the unmasked various features in a data structure that is protected with read/write access. This may ensure that the privacy of the image is maintained on the user device 105. The segmentation may be performed in a non-conventional way where the image is preprocessed pixel-wise to alter an originality of the image and then segmented, which makes the segmented image difficult to crack with any brute force technique. The segments chosen to be masked may be identified by the user device 105 in equal combinations of clusters originally saved, thus making the segmented image more secure. Thus, implementations described herein may conserve computing resources, networking resources, and other resources that would have otherwise been consumed by having private images misappropriated, attempting to recover the misappropriated private images, handling lawsuits associated with the misappropriated private images, attempting to locate the misappropriated private images, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
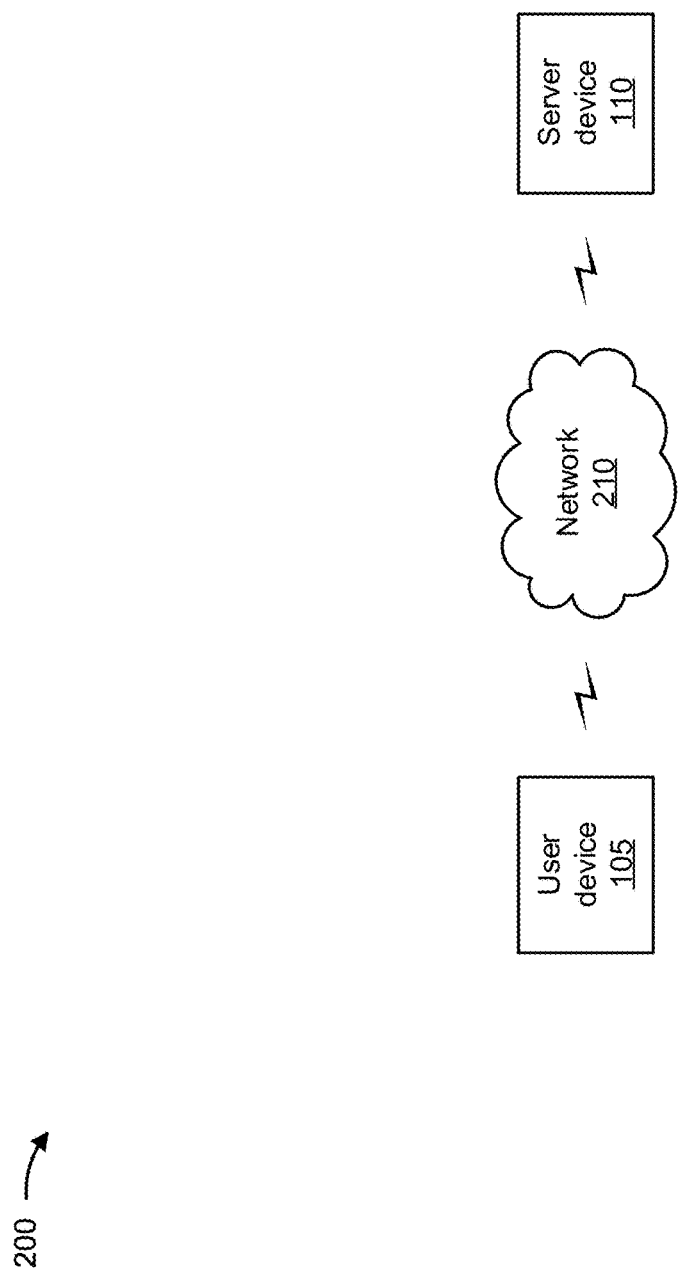
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the user device 105, the server device 110, and a network 210. Devices and/or elements of environment 200 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 110 includes one or more devices capable of receiving, generating, storing, processing, providing, and/or routing information, as described elsewhere herein. The server device 110 may include a communication device and/or a computing device. For example, the server device 110 may include a server, such as an application server, a client server, a web server, a database server, a host server, a proxy server, a virtual server (e.g., executing on computing hardware), or a server in a cloud computing system. In some implementations, the server device 110 includes computing hardware used in a cloud computing environment.

The network 210 includes one or more wired and/or wireless networks. For example, the network 210 may include a cellular network, a public land mobile network (PLMN), a local area network (LAN), a wide area network (WAN), a private network, the Internet, a core network (e.g., a fifth generation (5G) core network, a fourth generation (4G) core network, and/or the like), an edge network (e.g., a network that brings computation and data storage closer to a location to improve response times and save bandwidth), a far edge network (e.g., a network of location-based devices, such as customer premise equipment), and/or a combination of these or other types of networks. The network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
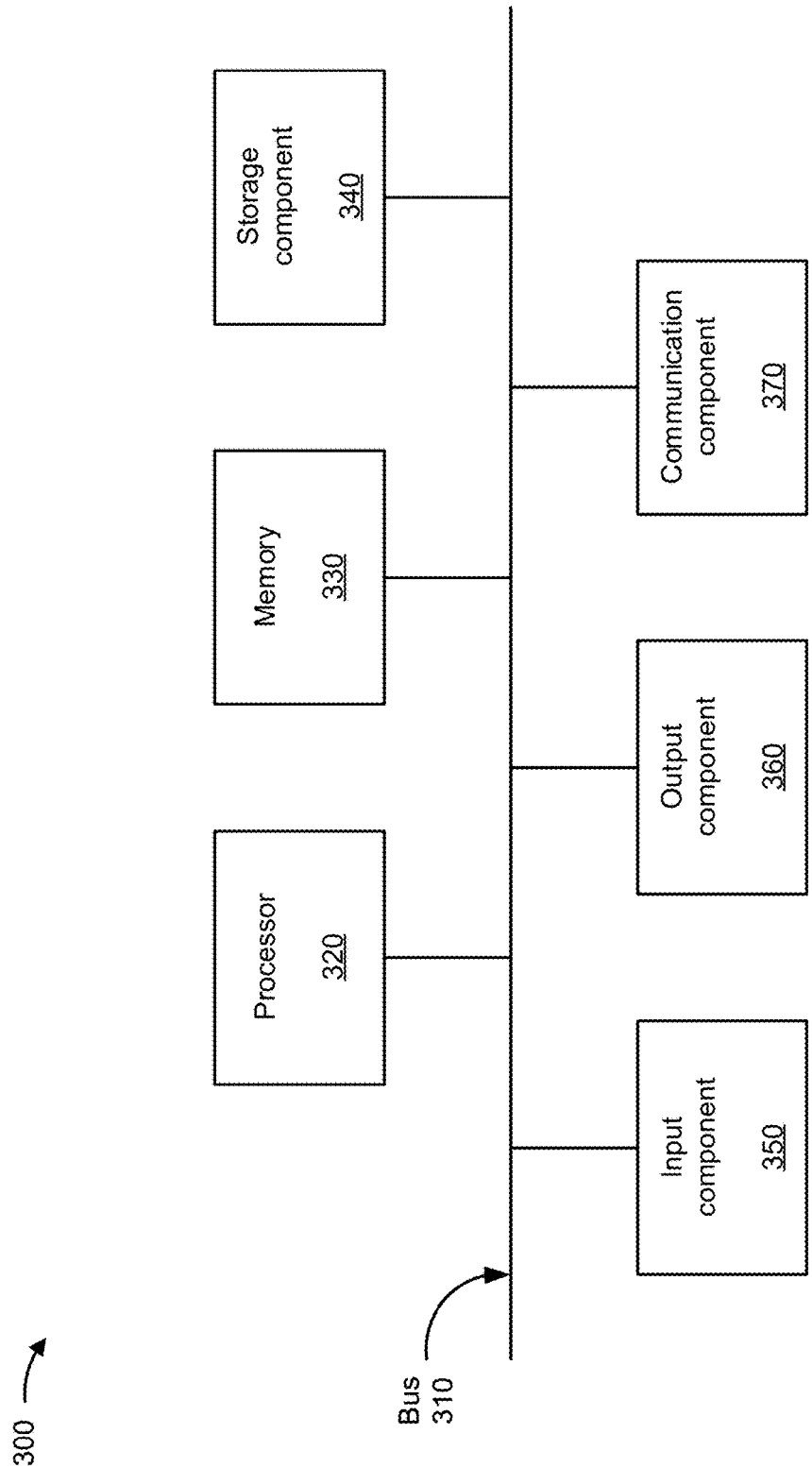
FIG. 3 is a diagram of example components of one or more devices of FIG. 2.

FIG. 3 is a diagram of example components of one or more devices of FIG. 2. The one or more devices may include a device 300, which may correspond to the user device 105 and/or the server device 110. In some implementations, the user device 105 and/or the server device 110 may include one or more devices 300 and/or one or more components of the device 300. As shown in FIG. 3, the device 300 may include a bus 310, a processor 320, a memory 330, a storage component 340, an input component 350, an output component 360, and a communication component 370.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory). The storage component 340 stores information and/or software related to the operation of device 300. For example, the storage component 340 may include a hard disk drive, a magnetic disk drive, an optical disk drive, a solid-state disk drive, a compact disc, a digital versatile disc, and/or another type of non-transitory computer-readable medium. The input component 350 enables device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
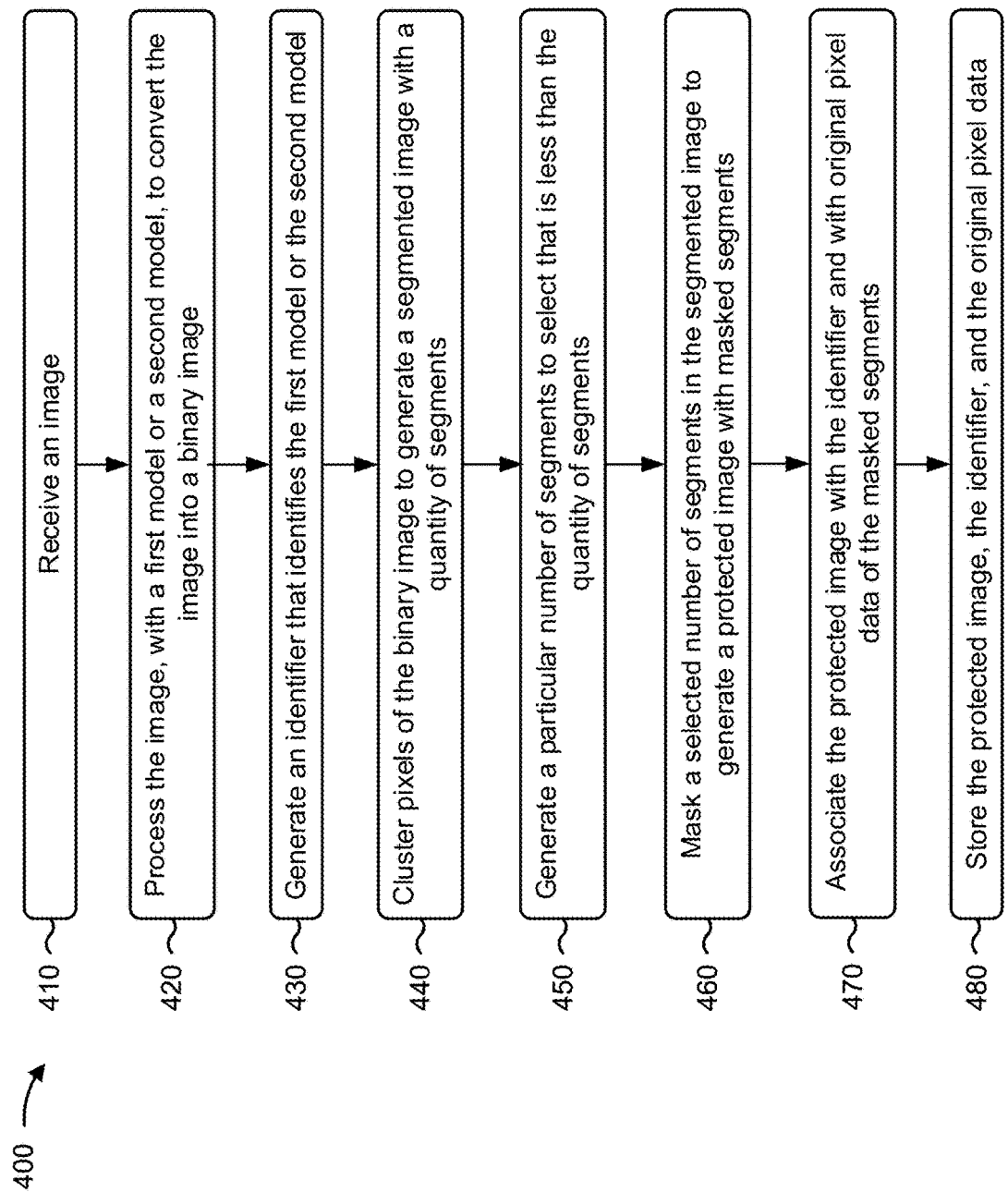
FIG. 4 is a flowchart of an example process for image preprocessing and segmentation for visual data privacy.

FIG. 4 is a flowchart of an example process 400 for image preprocessing and segmentation for visual data privacy. In some implementations, one or more process blocks of FIG. 4 may be performed by a device (e.g., the user device 105). In some implementations, one or more process blocks of FIG. 4 may be performed by another device or a group of devices separate from or including the device, such as a server device (e.g., the server device 110). Additionally, or alternatively, one or more process blocks of FIG. 4 may be performed by one or more components of the device 300, such as the processor 320, the memory 330, the storage component 340, the input component 350, the output component 360, and/or the communication component 370.

As shown in FIG. 4, process 400 may include receiving an image (block 410). For example, the device may receive an image, as described above.

As further shown in FIG. 4, process 400 may include processing the image, with a first model or a second model, to convert the image into a binary image (block 420). For example, the device may process the image, with a first model or a second model, to convert the image into a binary image, as described above. In some implementations, processing the image, with the first model, to convert the image into the binary image includes converting the image into a three-dimensional pixel array, converting the three-dimensional pixel array into a two-dimensional pixel array with an intensity denoted by intensities of black or white pixels, and converting the two-dimensional pixel array into the binary image, wherein an intensity of the binary image is inverted relative to the intensity of the two-dimensional pixel array.

In some implementations, processing the image, with the second model, to convert the image into the binary image includes converting the image into a three-dimensional pixel array, removing a dimension from the three-dimensional pixel array to generate a two-dimensional pixel array, and converting the two-dimensional pixel array into the binary image. In some implementations, the binary image is a two-dimensional pixel array with a first set of pixels associated with a first dimension and a second set of pixels associated with a second dimension. In some implementations, the first model is a binary swapping model, and the second model is a blind three-dimensional model.

In some implementations, processing the image, with the first model or the second model, to convert the image into the binary image includes selecting one of the first model or the second model; processing the image, with the first model, to convert the image into the binary image based on the first model being selected; and processing the image, with the second model, to convert the image into the binary image based on the second model being selected.

As further shown in FIG. 4, process 400 may include generating an identifier that identifies the first model or identifies the second model and a color removed from the image by the second model (block 430). For example, the device may generate an identifier that identifies the first model or identifies the second model and a color removed from the image by the second model, as described above.

As further shown in FIG. 4, process 400 may include utilizing color-space-based clustering to cluster pixels of the binary image and to generate a segmented image with a quantity of segments (block 440). For example, the device may utilize color-space-based clustering to cluster pixels of the binary image and to generate a segmented image with a quantity of segments, as described above.

As further shown in FIG. 4, process 400 may include generating a particular number of segments to select that is less than the quantity of segments (block 450). For example, the device may generate a particular number of segments to select that is less than the quantity of segments, as described above. In some implementations, the particular number of segments is greater than zero and less than the quantity of segments in the segmented image.

As further shown in FIG. 4, process 400 may include masking a selected number of segments in the segmented image to generate a protected image with masked segments (block 460). For example, the device may mask a selected number of segments in the segmented image to generate a protected image with masked segments, as described above.

As further shown in FIG. 4, process 400 may include associating the protected image with the identifier and with original pixel data of the masked segments (block 470). For example, the device may associate the protected image with the identifier and with original pixel data of the masked segments, as described above.

As further shown in FIG. 4, process 400 may include storing the protected image, the identifier, and the original pixel data of the masked segments in a data structure (block 480). For example, the device may store the protected image, the identifier, and the original pixel data of the masked segments in a data structure, as described above. In some implementations, the data structure includes a secure and encrypted data structure.

In some implementations, process 400 includes selecting, randomly or pseudorandomly, the selected number of segments from the quantity of segments. In some implementations, process 400 includes associating the identifier with the binary image, and storing the binary image in the data structure.

In some implementations, process 400 includes receiving a selection of a thumbnail of the image by a user of the device, providing the protected image for display based on the selection, determining whether the user is authenticated to access the image, and continuing to provide the protected image for display based on the user not being authenticated to access the image. In some implementations, process 400 includes one or more of causing the user to be reported to a network provider, causing the device to be powered off, disabling the device, or locking the device.

In some implementations, process 400 includes retrieving, from the data structure, the original pixel data of the masked segments based on the user being authenticated to access the image, replacing the masked segments with the original pixel data, in the protected image, to generate the image, and providing the image for display.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   utilizing, by a device, color-space-based clustering to cluster pixels of a binary image and to generate a segmented image with a quantity of segments;
   masking, by the device, a selected number of segments in the segmented image to generate a protected image with masked segments,
      wherein the selected number of segments is less than the quantity of segments;
   associating, by the device, the protected image with original pixel data of the masked segments; and
   storing, by the device, the protected image and the original pixel data of the masked segments in a data structure.

2. The method of claim 1, further comprising:
   selecting, randomly or pseudorandomly, the selected number of segments from the quantity of segments.

3. The method of claim 1, further comprising:
   receiving a selection of a thumbnail of an image;
   providing the protected image for display based on the selection;
   determining whether a user is authenticated to access the image; and
   continuing to provide the protected image for display based on the user not being authenticated to access the image.

4. The method of claim 3, further comprising one or more of:
   causing the user to be reported to a network provider;
   causing the device to be powered off;
   disabling the device; or
   locking the device.

5. The method of claim 3, further comprising:
   retrieving, from the data structure, the original pixel data of the masked segments based on the user being authenticated to access the image;
   replacing the masked segments with the original pixel data, in the protected image, to generate the image; and
   providing the image for display.

6. The method of claim 1, further comprising:
   converting an image into a three-dimensional pixel array;
   converting the three-dimensional pixel array into a two-dimensional pixel array with an intensity denoted by intensities of black or white pixels; and
   converting the two-dimensional pixel array into the binary image,
      wherein an intensity of the binary image is inverted relative to the intensity of the two-dimensional pixel array.

7. The method of claim 1, further comprising:
   processing an image, with a model, to convert the image into the binary image;
   associating the protected image with an identifier that identifies the model; and
   storing the identifier in the data structure in association with the protected image and the original pixel data of the masked segments.

8. A device, comprising:
   one or more processors configured to:
      process an image to convert the image into a binary image;
      utilize color-space-based clustering to cluster pixels of the binary image and to generate a segmented image with a quantity of segments;
      randomly or pseudorandomly select a particular number of segments, as selected segments, from the quantity of segments,
         wherein the particular number of segments is less than the quantity of segments;
      mask the selected segments in the segmented image to generate a protected image with masked segments,
         wherein the masked segments comprise original pixel data; and
      store the protected image and the original pixel data in a data structure.

9. The device of claim 8, wherein the one or more processors, to process the image to convert the image into the binary image, are configured to:
   convert the image into a three-dimensional pixel array;
   remove a dimension from the three-dimensional pixel array to generate a two-dimensional pixel array; and
   convert the two-dimensional pixel array into the binary image.

10. The device of claim 8, wherein the binary image is a two-dimensional pixel array with a first set of pixels associated with a first dimension and a second set of pixels associated with a second dimension.

11. The device of claim 8, wherein the one or more processors, to process the image to convert the image into the binary image, are configured to:
   process the image, with a binary swapping model or a blind three-dimensional model, to convert the image into the binary image.

12. The device of claim 8, wherein the data structure includes an encrypted data structure.

13. The device of claim 8, wherein the one or more processors, to process the image to convert the image into the binary image, are configured to:

process the image, with a model, to convert the image into the binary image.

14. The device of claim 13, wherein the one or more processors are further configured to:
store an identifier that identifies the model in the data structure in association with the protected image and the original pixel data of the masked segments.

15. A non-transitory computer-readable medium storing a set of instructions, the set of instructions comprising:
one or more instructions that, when executed by one or more processors of a device, cause the device to:
process an image, with a model, to convert the image into a binary image;
utilize color-space-based clustering to cluster pixels of the binary image and to generate a segmented image with a quantity of segments;
select, randomly or pseudorandomly, a particular number of segments, as selected segments, from the quantity of segments,
wherein the particular number of segments is less than the quantity of segments;
mask the selected segments in the segmented image to generate a protected image with masked segments, wherein the masked segments comprise original pixel data; and
store the protected image, an identifier that identifies the model, and the original pixel data in a data structure.

16. The non-transitory computer-readable medium of claim 15, wherein the one or more instructions further cause the device to:
receive a selection of a thumbnail of the image by a user of the device;
provide the protected image for display based on the selection;
determine whether the user is authenticated to access the image; and
continue to provide the protected image for display based on the user not being authenticated to access the image.

17. The non-transitory computer-readable medium of claim 16, wherein the one or more instructions further cause the device to:
retrieve, from the data structure, the original pixel data of the masked segments based on the user being authenticated to access the image;
replace the masked segments with the original pixel data, in the protected image, to generate the image; and
provide the image for display.

18. The non-transitory computer-readable medium of claim 15, wherein the one or more instructions, that cause the device to process the image, with the model, to convert the image into the binary image, cause the device to:
convert the image into a three-dimensional pixel array;
convert the three-dimensional pixel array into a two-dimensional pixel array with an intensity denoted by intensities of black or white pixels; and
convert the two-dimensional pixel array into the binary image,
wherein an intensity of the binary image is inverted relative to the intensity of the two-dimensional pixel array.

19. The non-transitory computer-readable medium of claim 15, wherein the one or more instructions, that cause the device to process the image, with the model, to convert the image into the binary image, cause the device to:
convert the image into a three-dimensional pixel array;
remove a dimension from the three-dimensional pixel array to generate a two-dimensional pixel array; and
convert the two-dimensional pixel array into the binary image.

20. The non-transitory computer-readable medium of claim 15, wherein the model is one of a binary swapping model or a blind three-dimensional model.

* * * * *